(12) United States Patent
Reddy et al.

(10) Patent No.: US 11,256,574 B1
(45) Date of Patent: Feb. 22, 2022

(54) METHOD AND SYSTEM FOR BACKING UP CLOUD NATIVE AND NON-CLOUD NATIVE APPLICATIONS

(71) Applicant: EMC IP Holding Company LLC, Hopkinton, MA (US)

(72) Inventors: Anand Reddy, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/025,976

(22) Filed: Sep. 18, 2020

(51) Int. Cl.
*G06F 11/00* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/0614* (2013.01); *G06F 11/1461* (2013.01); *G06F 11/1464* (2013.01); *G06F 2201/805* (2013.01)

(58) Field of Classification Search
CPC ............. G06F 11/1446; G06F 11/1448; G06F 11/1451; G06F 11/1458; G06F 11/1464; G06F 11/1469; G06F 11/2094; G06F 3/0614; G06F 3/065
See application file for complete search history.

(56) References Cited

U.S. PATENT DOCUMENTS

| 2014/0082166 | A1* | 3/2014 | Robinson | G06F 9/5072 709/223 |
| 2017/0357553 | A1* | 12/2017 | Zhao | G06F 16/907 |
| 2020/0019471 | A1* | 1/2020 | Natanzon | G06F 11/302 |
| 2020/0133795 | A1* | 4/2020 | Rhodes | H04L 41/5058 |

* cited by examiner

*Primary Examiner* — Michael Maskulinski
(74) *Attorney, Agent, or Firm* — Chamberlain, Hrdlika, White, Williams & Aughtry

(57) ABSTRACT

A method for backing up data is performed by a backup manager. The method includes obtaining, by the backup manager, a first request from a host, wherein the first request is associated with an application on the host; in response to the first request: obtaining backup policies; obtaining a tag associated with the application; making a first determination that the tag indicates that the application is a cloud native application; and in response to the first determination: associating the application with a cloud native backup policy, wherein the cloud native backup policy is one of the backup policies; and initiating backup generation of the application based on the cloud native backup policy.

20 Claims, 11 Drawing Sheets

METHOD AND SYSTEM FOR BACKING UP CLOUD NATIVE AND NON-CLOUD NATIVE APPLICATIONS

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method performed to back up data. The method includes obtaining, by a backup manager, a first request from a host, wherein the first request is associated with an application on the host; in response to the first request: obtaining backup policies; obtaining a tag associated with the application; making a first determination that the tag indicates that the application is a cloud native application; and in response to the first determination: associating the application with a cloud native backup policy, wherein the cloud native backup policy is one of the backup policies; and initiating backup generation of the application based on the cloud native backup policy.

In general, in one aspect, the invention relates to a system that is used to back up data. The system includes a processor; and a backup manager, which when executed by the processor preforms a method. The method includes obtaining, by the backup manager, a first request from a host, wherein the first request is associated with an application on the host; in response to the first request: obtaining backup policies; obtaining a tag associated with the application; making a first determination that the tag indicates that the application is a cloud native application; and in response to the first determination: associating the application with a cloud native backup policy, wherein the cloud native backup policy is one of the backup policies; and initiating backup generation of the application based on the cloud native backup policy.

In general, in one aspect, the invention relates to a non-transitory computer readable medium which includes computer readable program code, which when executed by a computer processor enables the computer processor to perform a method for backing up data. The method includes obtaining, by the backup manager, a first request from a host, wherein the first request is associated with an application on the host; in response to the first request: obtaining backup policies; obtaining a tag associated with the application; making a first determination that the tag indicates that the application is a cloud native application; and in response to the first determination: associating the application with a cloud native backup policy, wherein the cloud native backup policy is one of the backup policies; and initiating backup generation of the application based on the cloud native backup policy.

DETAILED DESCRIPTION

Figure 1A:
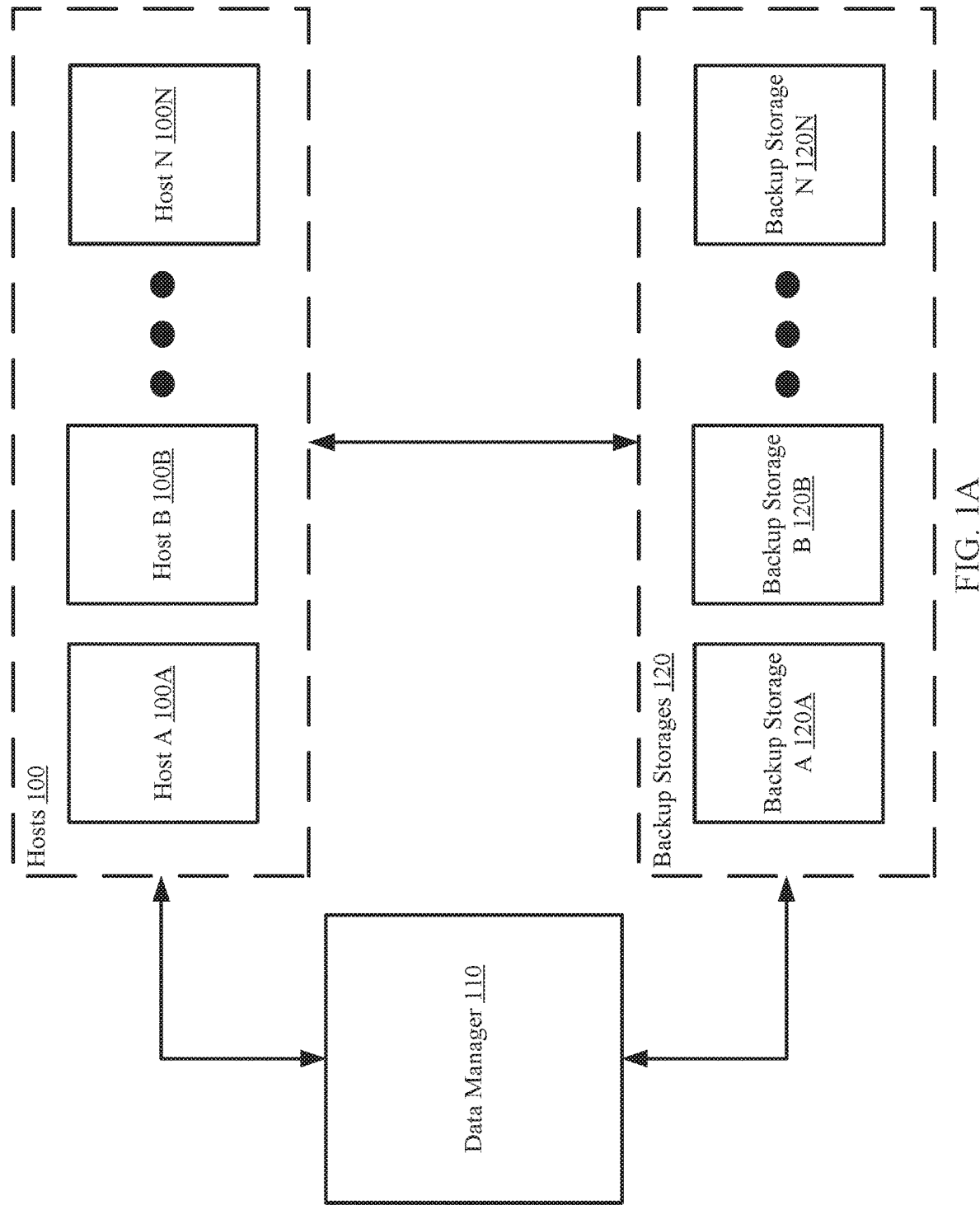
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for backing up data associated with cloud native applications and non-cloud native applications.

More specifically, embodiments of the invention relate to assigning tags to applications based on host metadata that indicate whether an application is a cloud native application or a non-cloud native application. A data manager may then use these tags to assign cloud native backup policies to cloud native applications, and to assign non-cloud native backup policies to non-cloud native applications. Additionally, there may be multiple backup policies of cloud native applications and multiple backup policies for non-cloud native applications. The tags may also be used to determine which of the cloud native backup policies to associate with cloud native applications and which of the non-cloud native backup policies to associate with non-cloud native applications.

FIG. 1A shows a diagram of a system in accordance with one or more embodiments of the invention. The system may include hosts (100), a data manager (110) and backup storages (120). The hosts (100) may include one or more hosts, e.g., host A (100A), host B (100B), and host N (100N). The backup storages (120) may include one or more backup storages, e.g., backup storage A (120A), backup storage B (120B), and backup storage N (120N). The system may include additional, fewer, and/or different components without departing from the invention. Each component may be operably connected to any of the other components via any combination of wired and/or wireless connections. Each of the aforementioned components is discussed below.

In one or more embodiments of the invention, the hosts (100) provide services to clients (not shown) and generate cloud native and non-cloud native backups. The hosts (100) may also request backup generation of application data and request registration of applications hosted by the hosts (100). The hosts (100) may also provide host metadata to the data manager (110), and may provide cloud native backups and non-cloud native backups to the backup storages (120). The host (100) may include other and/or additional functionality without departing from the invention. For additional information regarding the hosts (100), refer to e.g., FIG. 1C.

Figure 5:
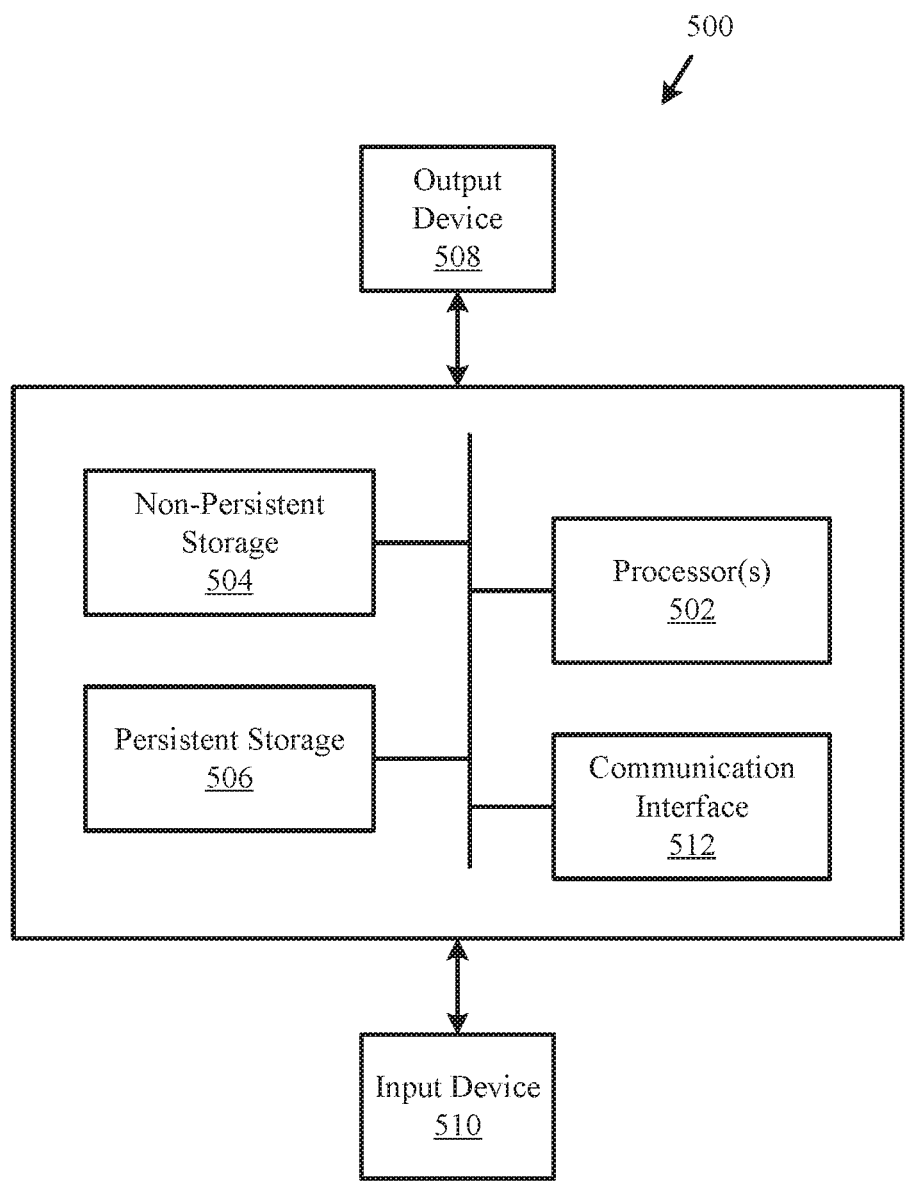
FIG. 5 shows a diagram of a computing device in accordance with one or more embodiments of the invention.

In one or more embodiments of the invention, each of the hosts (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 100A) described throughout this application.

In one or more embodiments of the invention, each of the hosts (100) is implemented as a logical device. The logical device may utilize the computing resources of any number of computing devices and thereby provide the functionality of the hosts (100) described throughout this application.

In one or more embodiments the invention, the data manager (110) includes the functionality to generate and associate tags with applications of the hosts (100) based on host metadata obtained from hosts (100). The data manager (110) may also include the functionality to assign backup policies to applications based on the tags associated with the aforementioned tags. The data manager (110) may also include the functionality to initiate the generation of cloud native backups and non-cloud native backups of application data. The data manager (110) may include other and/or additional functionality without departing from the invention. For additional information regarding the data manager (110), refer to e.g., FIG. 1B.

In one or more embodiments of the invention, the data manager (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (110) described throughout this application.

In one or more embodiments of the invention, the data manager (110) is implemented as a logical device. The logical device may utilize the computing resources of any number of computing devices and thereby provide the functionality of the data manager (110) described throughout this application.

In one or more embodiments of the invention, the backup storages (120) include the functionality to store cloud native backups and non-cloud native backups of application data obtained from the hosts (100). The backup storage (120) may also include the functionality to provide the cloud native backups and non-cloud native backups to the hosts (100) for restoration purposes and/or other purposes without departing from the invention. The backup storages (120) may include any number of backup storages (e.g., backup storage A (120A), backup storage B (120B), backup storage N (120N)). The backup storages (120) may include other and/or additional functionality without departing from the invention. For additional information regarding the backup storages (120), refer to e.g., FIG. 1D.

In one or more embodiments of the invention, each backup storage (e.g., 120A, 120B, 120N) of the backup storages (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage (e.g., 120A, 120B, 120N) described throughout this application.

In one or more embodiments of the invention, each of the backup storages (e.g., 120A, 120B, 120N) of the backup storages (120) is implemented as a logical device. The logical device may utilize the computing resources of any number of computing devices and thereby provide the functionality of the backup storages (e.g., 120A, 120B, 120N) described throughout this application.

Figure 1B:
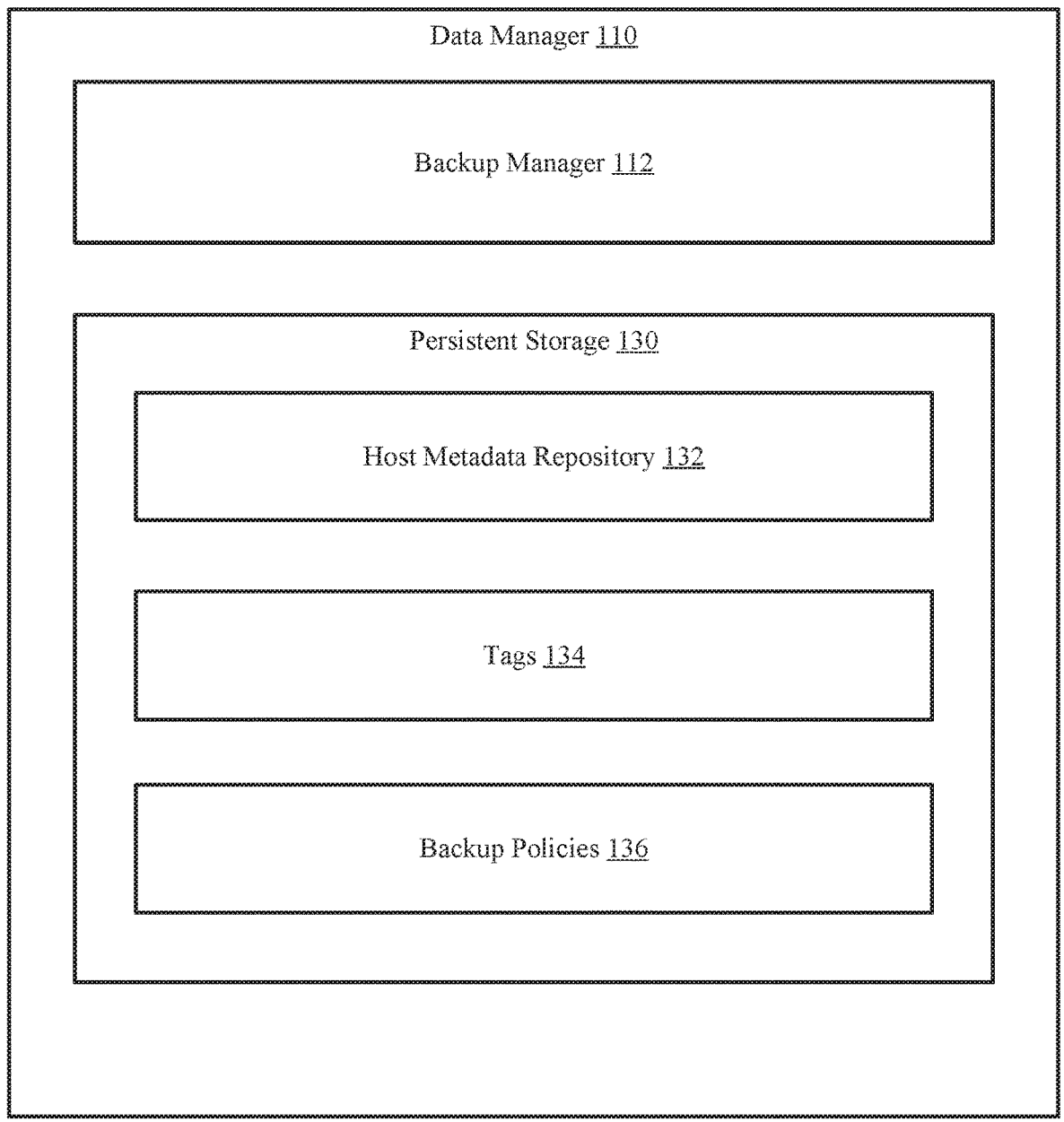
FIG. 1B shows a diagram of a data manager in accordance with one or more embodiments of the invention.

FIG. 1B shows a diagram of a data manager in accordance with one or more embodiments of the invention. The data manager (110) may be an embodiment of the data manager (110, FIG. 1A) discussed above. As discussed above, the data manager (110) may generate and associate tags with applications based on host metadata obtained from the hosts (100, FIG. 1A). The data manager (110) may also assign backup policies to applications based on the tags associated with the applications. The data manager (110) may include a backup manager (112) and persistent storage (130). The data manager may include additional, fewer, and/or different components without departing from the invention. Each of the aforementioned components is discussed below.

In one or more embodiments of the invention, the data manager (110) includes a backup manager (112) as discussed above. The backup manager (112) may include the functionality to generate and associate tags with applications hosted by the hosts (100, FIG. 1A). The backup manager (112) may generate and associate tags with applications hosted by the hosts (100, FIG. 1A) via the method illustrated in FIG. 3A. The backup manager (112) may include the functionality to assign backup policies to applications based on tags associated with the aforementioned applications. The backup manager (112) may assign backup policies to applications based on tags associated with the aforementioned applications via the method illustrated in FIG. 3B. The backup manager (112) may include other and/or additional functionality without departing from the invention.

In one or more embodiments of the invention, the backup manager (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (112) described throughout this application.

In one or more embodiments of the invention, the backup manager (112) is implemented as computer instructions, e.g., computer code, stored on a persistent storage that when executed by a processor of the data manager (110) causes the data manager (110) to provide the functionality of the backup manager (112) described throughout this application.

In one or more embodiments of the invention, the persistent storage (130) stores data. The data stored in persistent storage (130) may include host metadata. The persistent storage (130) may include other and/or additional data without departing from the invention. The persistent storage (130) may include a host metadata repository (132), tags (134), and backup policies (136). Each of these data structures is discussed below.

In one or more embodiments of the invention, the host metadata repository (132) includes one or more data structures that include information associated with applications hosted by the hosts (100, FIG. 1A). The host metadata repository (132) may include other and/or additional information without departing from the invention. For additional information regarding the host metadata repository (132), refer to e.g., FIG. 2.

In one or more embodiments of the invention, the tags (134) are one or more data structures that indicate characteristics of applications hosted by the hosts (100, FIG. 1A). Each tag of the tags (134) may be associated with a characteristic of the applications (i.e., application information (discussed below)). The application characteristics (which may be specified in the application information) may include, for example, storage type associated with applications (i.e., cloud native storage and non-cloud native storage), operating system associated with the application (e.g., Linux), storage location, and other and/or additional application characteristics without departing from the invention.

The tags (134) may be generated by a user of the system and/or the backup manager (112). A user of the system may be a backup administrator. A user of the system may be another type of user without departing from the invention. The tags (134) may be associated with applications by a user of the system and/or the backup manager (112). Each application may be associated with any number of tags (134). The tags (134) may be identifiers that may be used to identify characteristics of applications. The identifiers may be unique, global bit and/or character strings associated with an application characteristic. The tags (134) and/or copies of the tags (134) may be included in the host metadata repository and associated with application identifiers. The tags (134) may be used by the backup manager (112) to assign backup policies (136) to applications without the need for user intervention.

In one or more embodiments of the invention, the backup policies (136) are one or more data structures that include guidelines or requirements for backing up application data. The guidelines or requirements may include schedules, storage locations, backup types, and other and/or additional backup guidelines and/or requirements for backing up applications without departing from the invention. The backup policies (136) may include both cloud native backup policies and non-cloud native backup policies. The backup policies (136) may include any number of cloud native backup policies and non-cloud native backup policies. The backup policies may be generated by a user of the system and may be assigned to applications by the backup manager (112) and/or a user of the system based on tags (134) associated with the aforementioned applications. Each backup policy of the backup policies (136) may be associated with one or more tags (134) The backup policies (136) may include copies of the tag(s) to which they are associated with.

Additionally, non-cloud native backup policies may include backup policies generated to protect non-cloud native applications that are non-containerized. In other words, non-cloud native applications may require a virtual machine to run each non-cloud native application. Cloud native backup policies may be generated to protect cloud native applications operating on cloud native systems. For example, the cloud native backup policies may include backup policies that protect Kubernetes deployments, which may include containerized cloud native applications and may not be sufficiently protected with non-cloud native backup policies.

The persistent storage (130) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
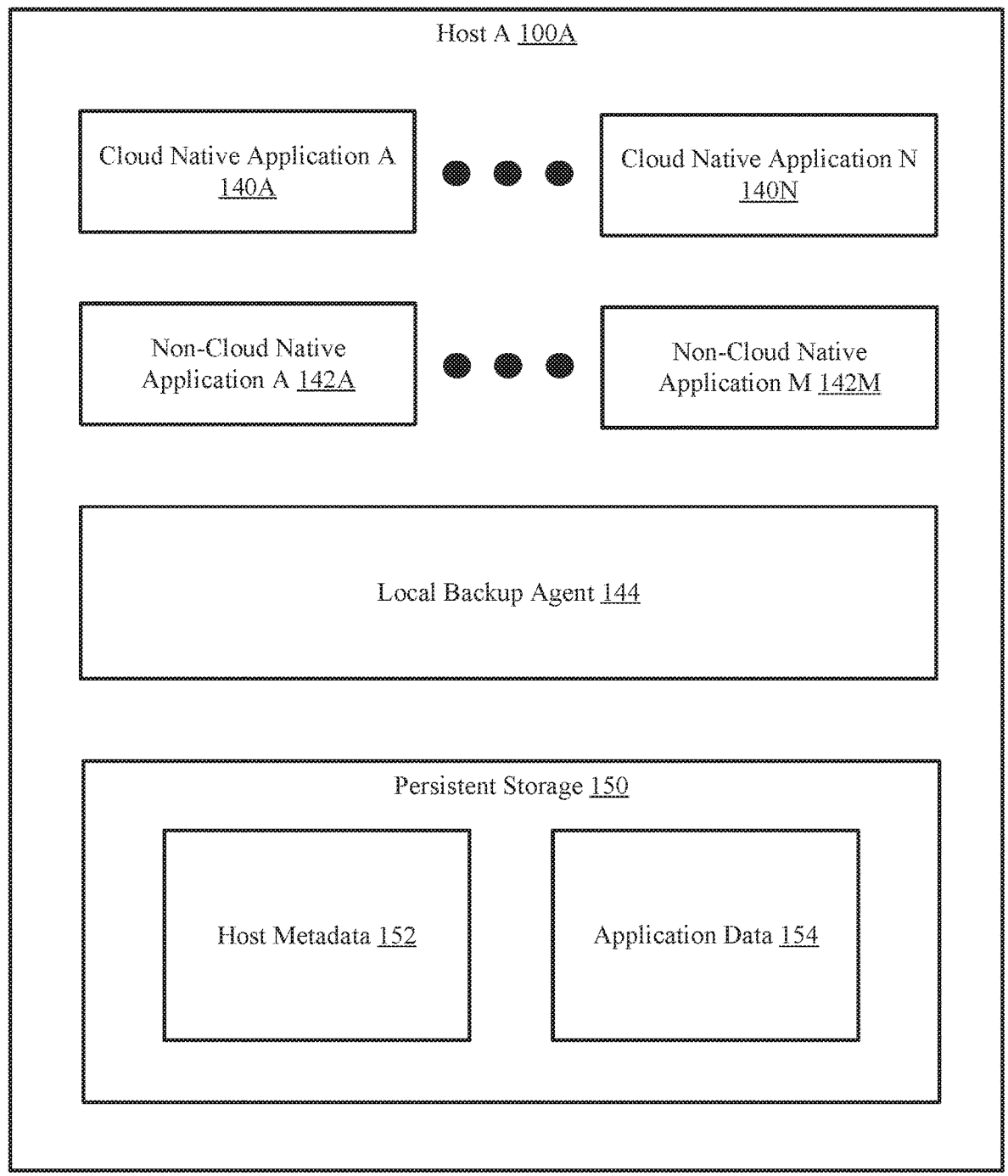
FIG. 1C shows a diagram of a host in accordance with one or more embodiments of the invention.

FIG. 1C shows a diagram of a host in accordance with one or more embodiments of the invention. Host A (100A) may be an embodiment of a host of the hosts (100, FIG. 1A) discussed above. As discussed above, host A (100A) provides services to clients (not shown) and generates cloud native and non-cloud native backups. Host A (100A) may also request backup generation of application data and request registration of applications hosted by host A (100A). Host A (100A) may also provide host metadata to the data manager (110), and may provide cloud native backups and non-cloud native backups to the backup storages (120). Host A (100A) may include any number of cloud native applications, e.g., cloud native application A (140A) and cloud native application N (140N). Host A (100A) may also include any number of non-cloud native applications, e.g., non-cloud native application A (142A) and non-cloud native application M (142M). Host A (100A) may also include a local backup agent (144) and persistent storage (150). Host A (100A) may include additional, fewer, and/or different components without departing from the invention. Each of the aforementioned components is discussed below.

In one or more embodiments of the invention, host A (100A) hosts one or more applications. In one or more embodiments of the invention, the applications (140A, 140N, 142A, 142M) perform services for clients (not shown). The services may include writing, reading, and/or otherwise modifying data that is stored in host A (100A). The applications (140A, 140N, 142A, 142M) may each include functionality for writing data to host A (100A). The applications may be, for example, instances of databases, email servers, and/or other applications. Host A (100A) may host other types of applications without departing from the invention.

The applications may be cloud native applications (e.g., cloud native application A (140A) and cloud native application N (140N)) and/or non-cloud native applications (e.g., non-cloud native application A (142A) and non-cloud native application M (142M)). The cloud native applications (e.g., 140A, 140N) are designed to natively execute on cloud native storage and/or on cloud native systems. The cloud native applications (e.g., 140A, 140N) may execute in containers which may include the functionality to scale up or down to provide the storage resources necessary for increasing and decreasing storage demands. A cloud native application (e.g., 140A, 140N) may be, for example, a Docker container operating on a logical device. A cloud native application (e.g., 140A, 140N) may include any other type of application with the aforementioned functionality without departing from the invention. Cloud native storage may be, for example, first class disks (i.e., a type of virtual machine disk). Cloud native storage may be fully automated and may enable varying levels of granularity and scalability for backup generation and on-demand volume provisioning of cloud native applications (e.g., 140A, 140N) independent of the virtual machines (or more generally the cloud native system) on which the cloud native applications (e.g., 140A, 140N) are required to operate.

Cloud native applications (e.g., 140A, 140N) may be associated with other and/or additional cloud native storages and/or other and/or additional cloud native systems without departing from the invention. Cloud native applications may require cloud native backup policies. Cloud native systems include software platforms designed to support cloud native applications (i.e., software platforms on which cloud native applications execute). Cloud native systems may include, for example, Kubernetes, Docker, and other and/or additional systems with the aforementioned functionality without departing from the invention. Non-cloud native applications (e.g., 142A, 142M) may include standalone applications that may not require scalability and may, for example, be hosted on a physical or virtual stack. Non-cloud native applications (e.g., 142A, 142M) may not be associated with cloud native storages and/or may not be associated with cloud native systems. Non-cloud native applications (e.g., 142A, 142M) may require non-cloud native backup policies. A non-cloud native application (e.g., 142A, 142M) may be for example, an Oracle or SQL database operating on a bare-metal server, a file system operating in a VMware system, or any other type of application with the aforementioned functionality without departing from the invention.

In one or more of embodiments of the invention, the applications (140A, 140N, 142A, 142M) are implemented as computer instructions, e.g., computer code, stored on a persistent storage that when executed by a processor(s) of host A (100A) cause host A (100A) to provide the functionality of the applications (140A, 140N, 142A, 142M) described throughout this application.

In one or more embodiments of the invention, host A (100A) includes a local backup agent (144) as discussed above. The local backup agent (144) may include the functionality to (i) generate and provide host metadata (152) to the data manager (110, FIG. 1A), (ii) store host metadata (152) and application data (154) in persistent storage (150), (iii) generate and provide cloud native backups and non-cloud native backups to backup storages based on backup policies (136, FIG. 1B) and (iv) obtain and provide requests to the data manager (110, FIG. 1A). The local backup agent (144) may include other and/or additional functionality without departing from the invention.

In one or more embodiments of the invention, the local backup agent (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the local backup agent (144) described throughout this application.

In one or more embodiments of the invention, the local backup agent (144) is implemented as computer instructions, e.g., computer code, stored on a persistent storage that when executed by a processor of host A (100A) causes host A (100A) to provide the functionality of the local backup agent (144) described throughout this application.

In one or more embodiments of the invention, the persistent storage (150) stores data. The persistent storage (150) may include host metadata (152) and application data (154). The persistent storage (150) may include other and/or additional data without departing from the invention. Each of these data structures is discussed below.

In one or more embodiments of the invention, the host metadata (152) is one or more data structures that includes information regarding the applications (e.g., 140A, 140N, 142A, 142M) hosted by host A (100A). The host metadata (152) may be generated by the local backup agent (144) and provided to the data manager (110, FIG. 1A) by the local backup agent when an application (e.g., 140A, 140N, 142A, 142M) registers with the data manager (110, FIG. 1A). The host metadata may be used by the data manager to generate and associated tags with the applications (e.g., 140A, 140N, 142A, 142M) hosted by host A as discussed above. The host metadata (152) may be used for other and/or additional purposes without departing from the invention. For additional information regarding host metadata (152), refer to FIG. 2.

In one or more embodiments of the invention, the application data (154) is one or more data structures that include data generated and/or utilized by applications (e.g., 140A, 140N, 142A, 142M) hosted by host A (100A) and/or users of the applications (e.g., clients, not shown). The application data (154) may be used by the local backup agent (144) to generate cloud native backups and non-cloud native backups (both discussed below) based on backup policies (136, FIG. 1B). The application data may include data associated with cloud native applications (e.g., 140A, 140N) and/or non-cloud native applications (e.g., 142A, 142M). The application data (154) may include, for example, email data, database data, and word processing data. The application data (154) may include other and/or additional types of data related to the applications (e.g., 140A, 140N, 142A, 142M) without departing from the invention.

The persistent storage (150) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (150) may utilize portions of any combination of hard disk drives, solid state disk drives, tape drives, and/or any other physical storage medium of any number of computing devices.

Figure 1D:
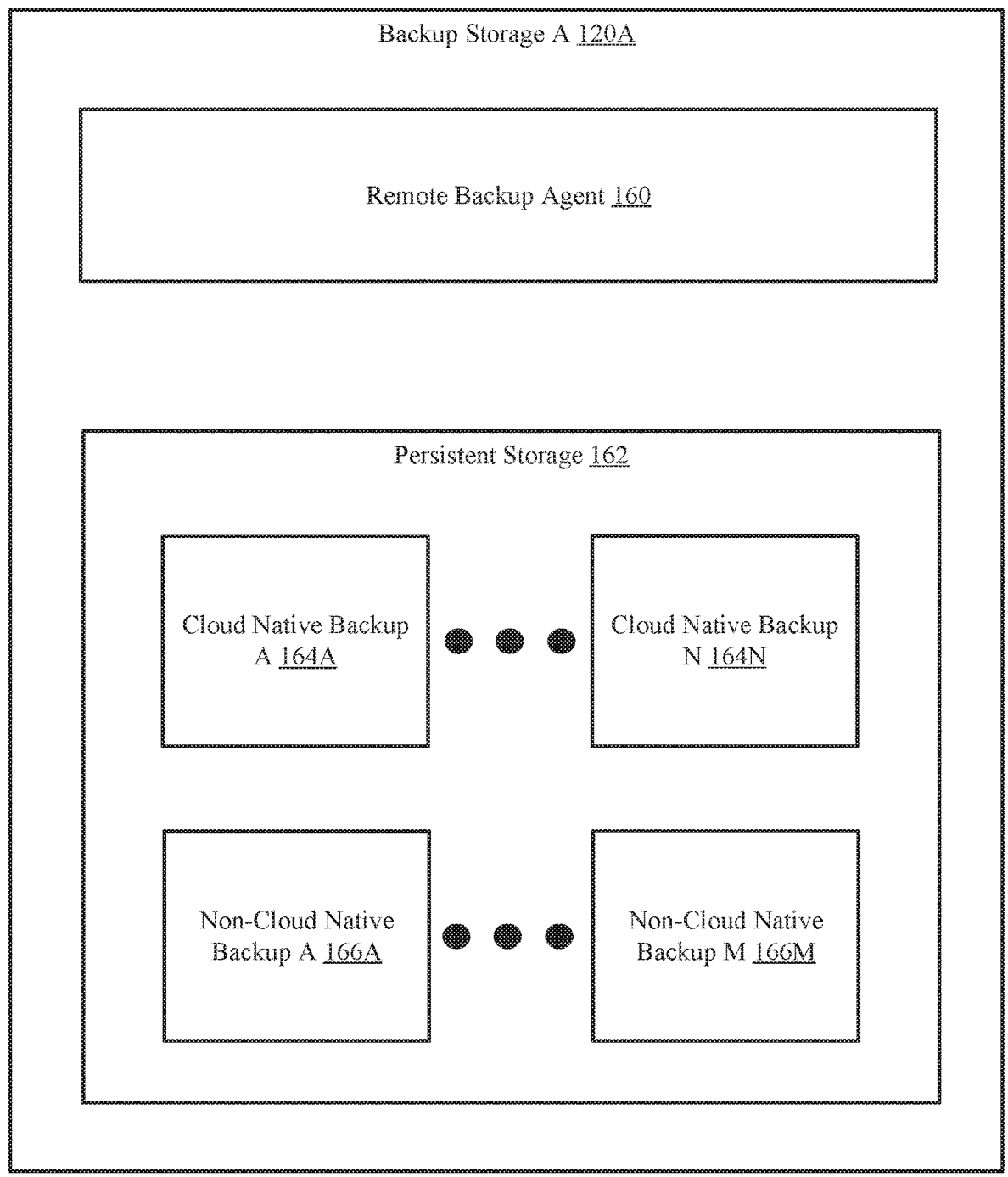
FIG. 1D shows a diagram of a backup storage in accordance with one or more embodiments of the invention.

FIG. 1D shows a diagram of a backup storage in accordance with one or more embodiments of the invention. Backup storage A (120A) may be an embodiment of a backup storage of the backup storages (120, FIG. 1A) discussed above. As discussed above, backup storage A (120A) may store cloud native backups and non-cloud native backups of application data obtained from the hosts (100). Backup storage A (120A) may also include the functionality to provide the cloud native backups and non-cloud native backups to the hosts (100) for restoration purposes and/or other purposes without departing from the invention. Backup storage A (120A) may include a remote backup agent (160) and persistent storage (162). Backup storage A (120A) may include additional, fewer, and/or different components without departing from the invention.

In one or more embodiments of the invention, backup storage A (120A) includes a remote backup agent (160) as discussed above. The remote backup agent (160) may include the functionality to (i) obtain and store cloud native backups and non-cloud native backups from hosts (100, FIG. 1A) in persistent storage (162), (ii) provide confirmation of storage of cloud native backups and non-cloud native backups to the data manager (110, FIG. 1A), and (iii) provide cloud native backups and non-cloud native backups to hosts (100, FIG. 1A) for restoration purposes. The remote backup agent (160) may include other and/or additional functionality without departing from the invention.

In one or more embodiments of the invention, the remote backup agent (160) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the remote backup agent (160) described throughout this application.

In one or more embodiments of the invention, the remote backup agent (160) is implemented as computer instructions, e.g., computer code, stored on a persistent storage that when executed by a processor of backup storage A (120A) causes backup storage A (120A) to provide the functionality of the remote backup agent (160) described throughout this application.

In one or more embodiments of the invention, the persistent storage (162) stores data. The persistent storage (162) may include cloud native backups (e.g., 164A, 164N) and non-cloud native backups (e.g., 166A, 166M). The persistent storage (162) may include any number of cloud native backups, e.g., cloud native backup A (164A) and cloud native backup N (164N), and any number of non-cloud native backups, e.g., non-cloud native backup A (166A) and non-cloud native backup M (166M). The persistent storage (162) may include other and/or additional data without departing from the invention. Each of these data structures is discussed below.

In one or more embodiments of the invention, the cloud native backups (e.g., 164A, 164N) may be one or more data structures that include backups of application data associated with cloud native applications (e.g., 140A, 140N, FIG. 1C). The cloud native backups (164A, 164N) may be generated by local backup agents (e.g., 144, FIG. 1C) of hosts (100, FIG. 1A). The cloud native backups (164A, 164N) may be generated based on one or more cloud native backup policies of the backup policies (136, FIG. 1B). The cloud native backups (164A, 164N) may be provided to hosts (100, FIG. 1A) to restore cloud native applications (e.g., 140A, 140N). The cloud native backups (164A, 164N) may include other and/or additional data and may be used for other and/or additional purposes without departing from the invention.

In one or more embodiments of the invention, the non-cloud native backups (e.g., 166A, 166M) may be one or more data structures that include backups of application data associated with non-cloud native applications (e.g., 142A, 142M, FIG. 1C). The non-cloud native backups (166A, 166M) may be generated by local backup agents (e.g., 144, FIG. 1C) of hosts (100, FIG. 1A). The non-cloud native backups (166A, 166M) may be generated based on one or more non-cloud native backup policies of the backup policies (136, FIG. 1B). The non-cloud native backups (166A, 166N) may be provided to hosts (100, FIG. 1A) to restore non-cloud native applications (e.g., 142A, 142M). The non-cloud native backups (166A, 166M) may include other and/or additional data and may be used for other and/or additional purposes without departing from the invention.

The persistent storage (162) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (162) may utilize portions of any combination of hard disk drives, solid state disk drives, tape drives, and/or any other physical storage medium of any number of computing devices.

Figure 2:
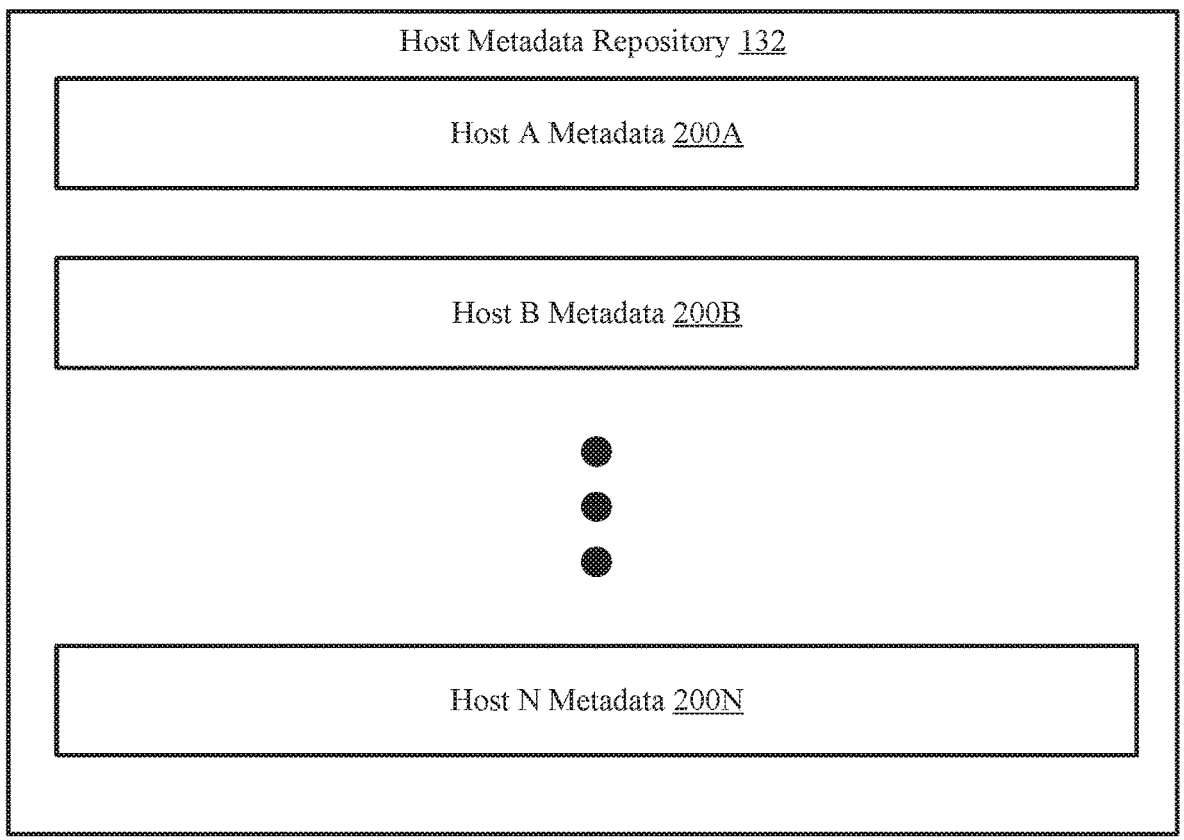
FIG. 2 shows a diagram of a host metadata repository in accordance with one or more embodiments of the invention.

FIG. 2 shows a diagram of a host metadata repository in accordance with one or more embodiments of the invention. The host metadata repository (132) may be an embodiment of the host metadata repository (132, FIG. 1B) discussed above. The host metadata repository may include one or more data structures that include information of applications hosted by the hosts (100). The host metadata repository may include one or more host metadata associated with one or more hosts (e.g., 100A, 100B, 100N, FIG. 1A), e.g., host A metadata (200A), host B metadata (200B), and host N metadata (200N). The host metadata repository (132) may be updated by the backup manager (112, FIG. 1B) of the data manager (110, FIG. 1B). The host metadata repository (132) may include other and/or additional information without departing from the invention. Each component of the host metadata repository (132) is discussed below.

Each host metadata, (i.e., host A metadata (200A), host B metadata (200B), and host N metadata (200N) may include information regarding the applications (e.g., 140A, 140N, 142A, 142M) hosted by a host (e.g., 100A, FIG. 1C) associated with the host metadata (e.g., 200A). Each host metadata (e.g., 200A, 200B, 200N) may include a host identifier, application identifiers, and application information, tag(s), and a backup policy (all not shown) associated with the application identifiers. Each host metadata (e.g., 200A, 200B, 200N) may include other and/or additional information without departing from the invention.

A host identifier may be a unique global bit string or character string that is associated with a host (e.g., 100A, FIG. 1A). The host identifier may be generated by the local backup agent (e.g., 144, FIG. 1C) of the host (e.g., 100A, FIG. 1C), the data manager (110, FIG. 1A), a user of the system, and/or other components without departing from the invention. The host identifier may be used by the data manager (110, FIG. 1A), a user of the system, and/or other components to specify a particular host (e.g., 100A, FIG. 1A). The host identifier may include other and/or additional information and may be used for other and/or additional purposes without departing from the invention.

The application identifiers may be unique global bit strings or character strings that are associated with an application (e.g., 140A, FIG. 1C) hosted by a host (e.g., 100A, FIG. 1C). The application identifiers may be generated by the local backup agent (e.g., 144, FIG. 1C) of the host (e.g., 100A, FIG. 1C), the data manager (110, FIG. 1A), a user of the system, and/or other components without departing from the invention. The application identifier may be used by the data manager (110, FIG. 1A), a user of the system, and/or other components to specify a particular application (e.g., 140A, FIG. 1C) of the applications hosted by the host (e.g., 100A, FIG. 1C). The application identifiers may include other and/or additional information and may be used for other and/or additional purposes without departing from the invention.

Each application identifier may be associated with application information. The application information may be associated with the application (e.g., 140A, FIG. 1C) associated with the application identifier. The application information may be generated by a local backup agent (e.g., 144, FIG. 1C) of the host (e.g., 100A, FIG. 1C) that hosts the application (e.g., 100A FIG. 1C) associated with the application information. The application information may be used by the data manager (110, FIG. 1A), a user of the system, and/or other and/or additional components to generate and/or associate tags with the application (e.g., 140A, FIG. 1C) associated with the application information. The application information may include information regarding, for example, the type of storage associated with the application and the operating system associated with the application (e.g., 140A, FIG. 1C). The application information may include other and/or additional information regarding the associated application (e.g., 140A, FIG. 1C) and may be used for other and/or additional purposes without departing from the invention.

As discussed above, each host metadata (e.g., 200A, 200B, 200N) may include tag(s), and a backup policy (or copies of tags and backup policies) that are associated with each application identifier of each host metadata. The tag(s) and backup policies may be included in host metadata (e.g., 200A, 200B, and 200N) by the backup manager (112, FIG. 1B) of the data manager (110, FIG. 1B) to associate the tag(s) and backup policies with applications (e.g., 140A, 140N, 142A, 142M, FIG. 1C). Each application identifier may be associated with one or more tags and a backup policy. The tag(s) and backup policies may be embodiments of tags and backup policies discussed above, and for additional information regarding tags and backup policies, refer to e.g., FIG. 1B.

Figure 3A:
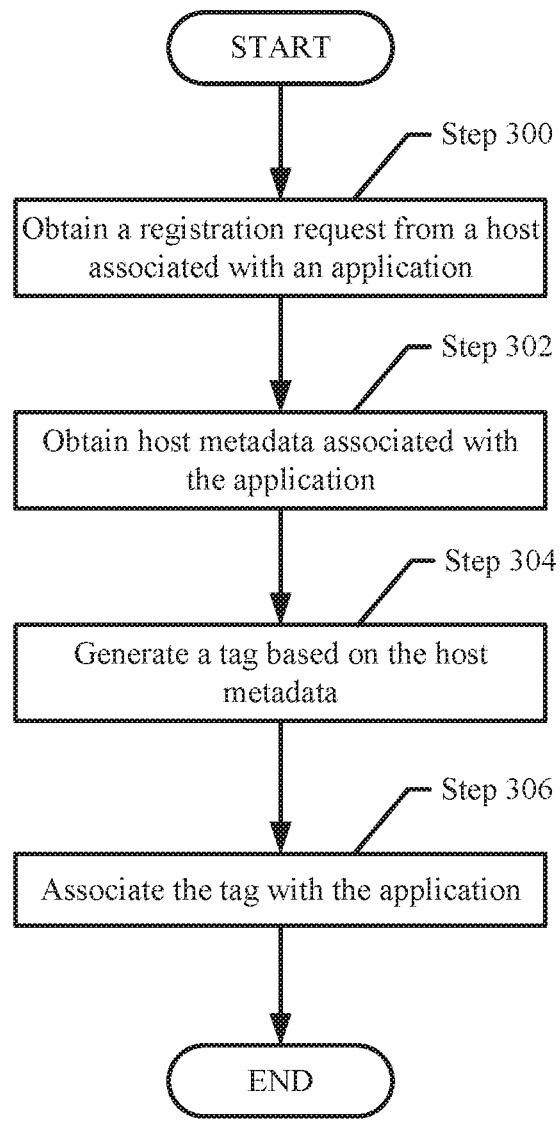
FIG. 3A shows a flowchart of a method for registering an application in accordance with one or more embodiments of the invention.

FIG. 3A shows a flowchart of a method for registering an application in accordance with one or more embodiments of the invention. The method shown in FIG. 3A may be performed by, for example, the backup manager (112, FIG. 1B) of the data manager. Other components of system illustrated in FIG. 1A may perform all, or a portion, of the method of FIG. 3A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 300, a registration request is obtained from a host associated with an application. In one or more embodiments of the invention, the host sends a message to the backup manager. The message includes a request to register an application. The registration request may include a host identifier associated with the host and an application identifier associated with the application. The registration request may be obtained from the host associated with the application via other and/or additional methods without departing from the invention.

In step 302, host metadata associated with the application is obtained. In one or more embodiments of the invention, the backup manager of the data manager sends a message to the host associated with the host identifier. The message includes a request for host metadata associated with the application. The message may also include the application identifier associated with the application. In response to obtaining the request, the host may obtain host metadata associated with the application by obtaining the host metadata associated with the application identifier. The host may then send the host metadata associated with the application to the backup manager of the data manager. The backup manager may then update the host metadata associated with the host in the host metadata repository to include the host metadata associated with the application. The host metadata associated with the application may be obtained via other and/or additional methods without departing from the invention.

In step 304, a tag is generated based on the host metadata. In one or more embodiments of the invention, the backup manager obtains a list of all the tags stored in persistent storage of the data manager and the host metadata associated with each of the tags. The backup manager may compare the host metadata associated with each of the tags and with the host metadata associated with the application to identify host metadata associated with a tag that matches the host metadata associated with a tag. The backup manager may generate a copy of that tag. The tag is generated based on the host metadata via other and/or additional methods without departing from the invention.

In one embodiment of the invention, the host metadata associated with the application may include host metadata that is associated with multiple tags. The backup manager may identify each tag that is associated with the host metadata associated with the application. The backup manager may generate copies of each identified tag.

In step 306, the tag is associated with the application. In one or more embodiments of the invention, the backup manager associates the tag with the application by updating the host metadata repository to include the tag. The backup manager may identify the host metadata of the host metadata repository using the host identifier and may identify the host metadata associated with the application using the application identifier. The backup manager may include the generated tag in the host metadata associated with the application to associate the tag with the application. The tag may be associated with the application via other and/or additional methods without departing from the invention.

In one embodiment of the invention, for scenarios in which multiple tags are generated, the backup manager may identify the host metadata of the host metadata repository using the host identifier and may identify the host metadata associated with the application using the application identifier. The backup manager may include the generated tags in the host metadata associated with the application to associate the tags with the application.

The method may end following step 306.

Figure 3B:
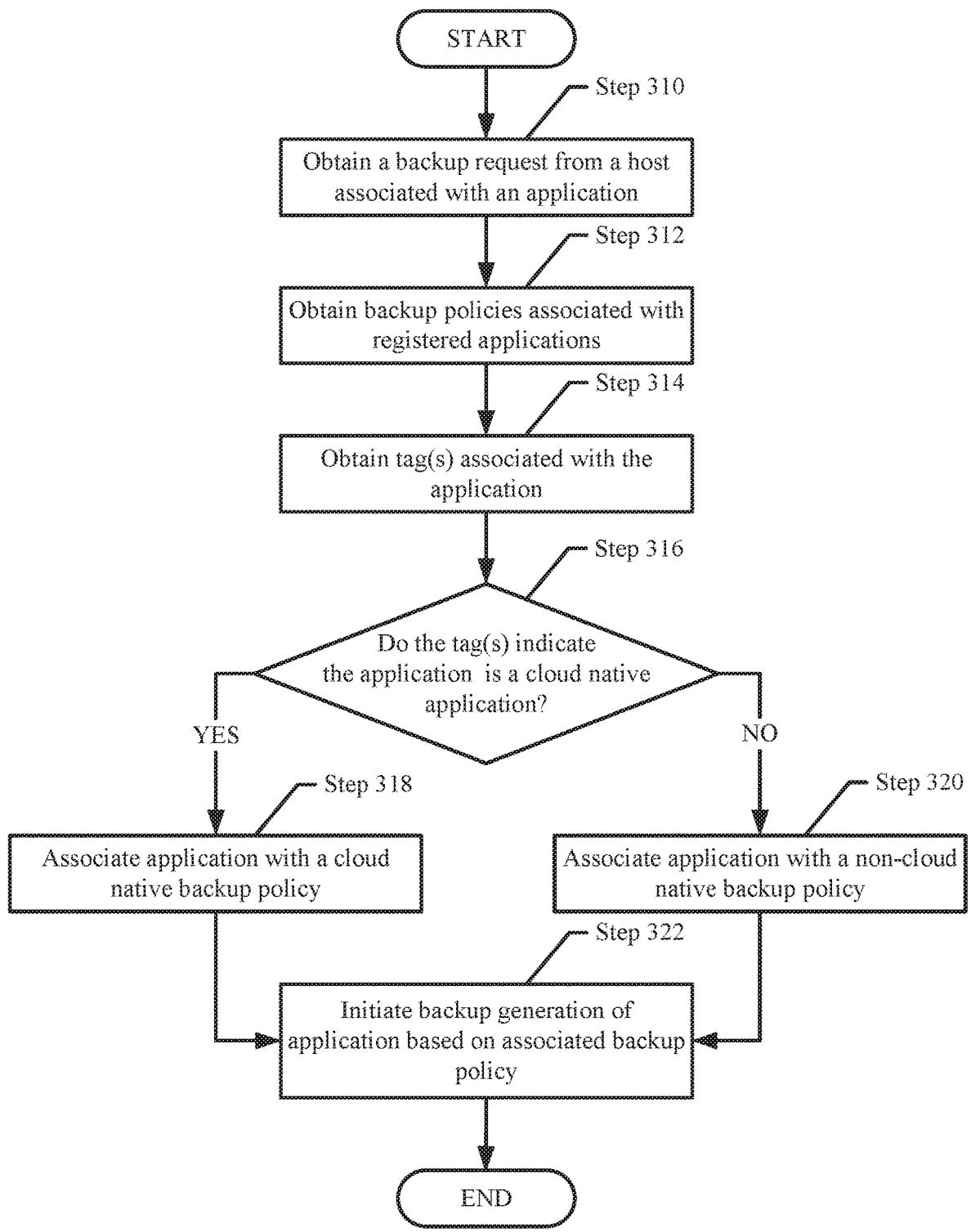
FIG. 3B shows a flowchart of a method for assigning backup policies in accordance with one or more embodiments of the invention.

FIG. 3B shows a flowchart of a method for assigning backup policies in accordance with one or more embodiments of the invention. The method shown in FIG. 3B may be performed by, for example, the backup manager (112, FIG. 1B) of the data manager. Other components of system illustrated in FIG. 1A may perform all, or a portion, of the method of FIG. 3B without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 310, a backup request associated with an application is obtained from a host. In one or more embodiments of the invention, a backup request is obtained from a host associated with an application. In one or more embodiments of the invention, the host sends a message to the backup manager. The message includes a request to generate a backup of an application. The request may include a host identifier associated with the host and an application identifier associated with the application. The backup request may be obtained from the host associated with the application via other and/or additional methods without departing from the invention.

In step 312, backup policies associated with the registered applications are obtained. In one or more embodiments of the invention, the backup manager of the data manager obtains all backup policies stored in persistent storage. The backup manager may also obtain a list of tags associated with each obtained backup policy. Backup policies may be obtained via other and/or additional methods without departing from the invention.

In step 314, tag(s) associated with the application are obtained. In one or more embodiments of the invention, the backup manager obtains the tag(s) from the host metadata repository. The backup manager may identify the host metadata of the host metadata repository using the host identifier and may identify the host metadata associated with the application using the application identifier. The backup manager may obtain the tag(s) included in the host metadata associated with the application. The tag(s) associated with the application may be obtained via other and/or additional methods without departing from the invention.

In step 316, a determination is made as to whether the tag(s) indicate the application is a cloud native application. In one or more embodiments of the invention, the backup manager uses the tag(s) associated with the application to determine whether the tag(s) indicate that the application is a cloud native application. The tag(s) associated with the application may include a cloud native application tag and/or a cloud native storage tag that indicates the application is a cloud native application. If the tag(s) associated with the application include a cloud native application tag and/or a cloud native storage tag, then the backup manager may determine that the tag(s) indicate that the application is a cloud native application. If the tag(s) associated with the application do not include a cloud native application tag and/or a cloud native storage tag, the backup manager may determine that the tag(s) indicate the application is not a cloud native application. A determination may be made as to whether the tag(s) indicate the application is a cloud native application via other and/or additional methods without departing from the invention.

If it is determined that the tag(s) indicate that the application is a cloud native application, then the method proceeds to step 318. If it is determined that the application is not a cloud native application, then the method may proceed to step 320.

In step 318, the application is associated with a cloud native backup policy. In one or more embodiments of the invention, the backup manager uses the obtained tag(s) and the tags associated with each backup policy to assign a backup policy to the application. The backup manager may compare the tag(s) associated with the application with the tags associated with each backup policy. The backup manager may identify a cloud native backup policy that is associated with the tags that match the tag(s) associated with the application. The backup manager may then assign the identified cloud native backup policy to the application by including a copy of the identified cloud native backup policy in the host metadata of the host metadata repository associated with the application. The application may be associated with a cloud native backup policy via other and/or additional methods without departing from the invention.

In step 320, the application is associated with a non-cloud native backup policy. In one or more embodiments of the invention, the backup manager uses the obtained tag(s) and the tags associated with each backup policy to assign a backup policy to the application. The backup manager may compare the tag(s) associated with the application with the tags associated with each backup policy. The backup manager may identify a non-cloud native backup policy that is associated with the tags that match the tag(s) associated with the application. The backup manager may then assign the identified non-cloud native backup policy to the application by including a copy of the identified non-cloud native backup policy in the host metadata of the host metadata repository associated with the application. The application may be associated with a non-cloud native backup policy via other and/or additional methods without departing from the invention.

In step 322, the backup generation of the application based on the associated backup policy is initiated. In one or more embodiments of the invention, the backup manager of the data manager sends a message to the host. The message may include a request to generate a backup of the application. The message may include the application identifier and the assigned backup policy (i.e., a cloud native backup policy or a non-cloud native backup policy). In response to obtaining the request, the host may generate a backup (i.e., a cloud native backup or a non-cloud native backup) of the application using the assigned backup policy. The host may send the generated backup to a backup storage, where the generated backup is stored in persistent storage. The backup storage may send confirmation to the host and the data manager that indicates the generated backup of the application was stored. The backup generation of the application based on the associated backup policy may be generated via other and/or additional methods without departing from the invention.

The method may end following step 322.

EXAMPLES

Figure 4A:
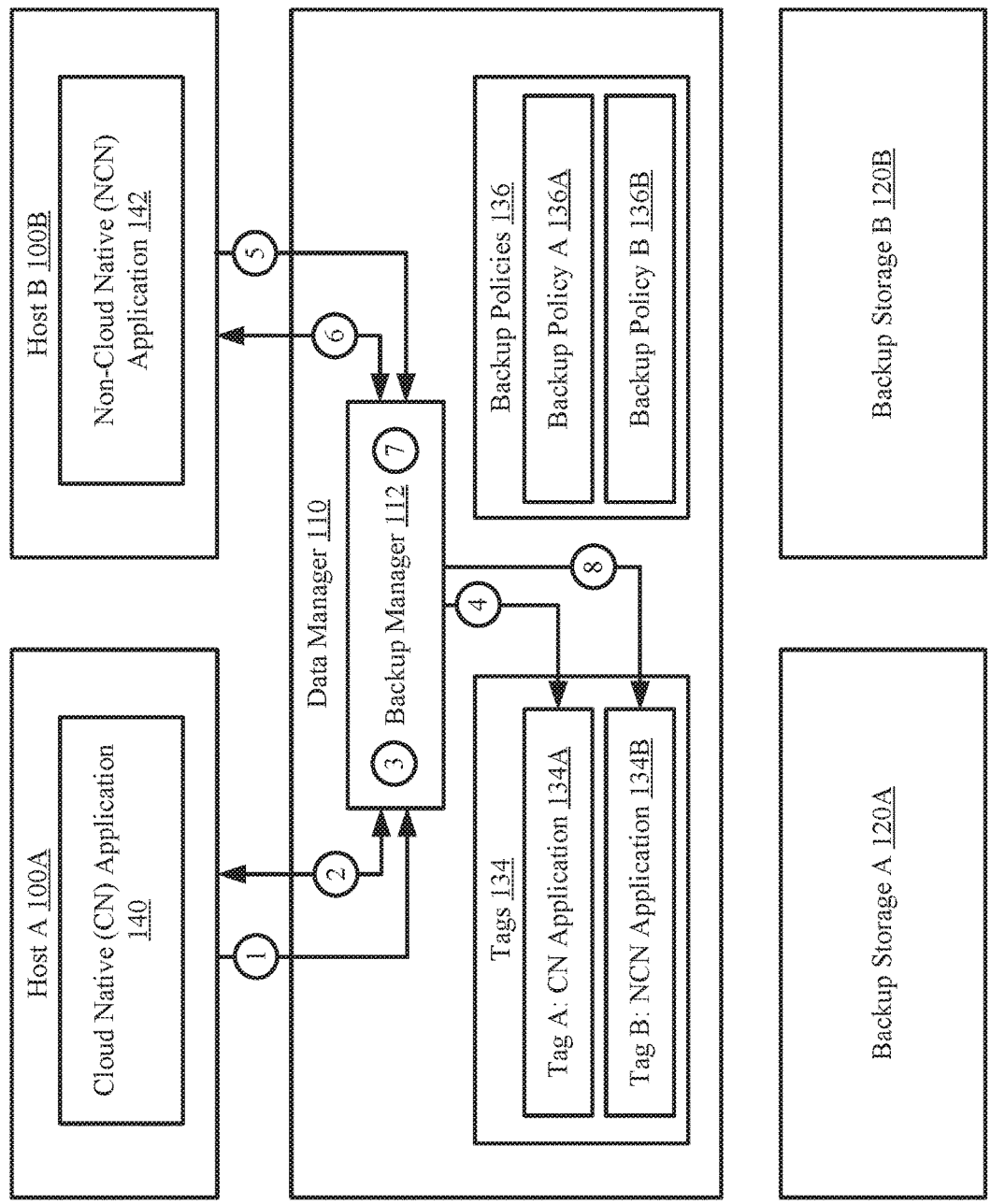
FIG. 4A shows a diagram of a first example in accordance with one or more embodiments of the invention.
Figure 4B:
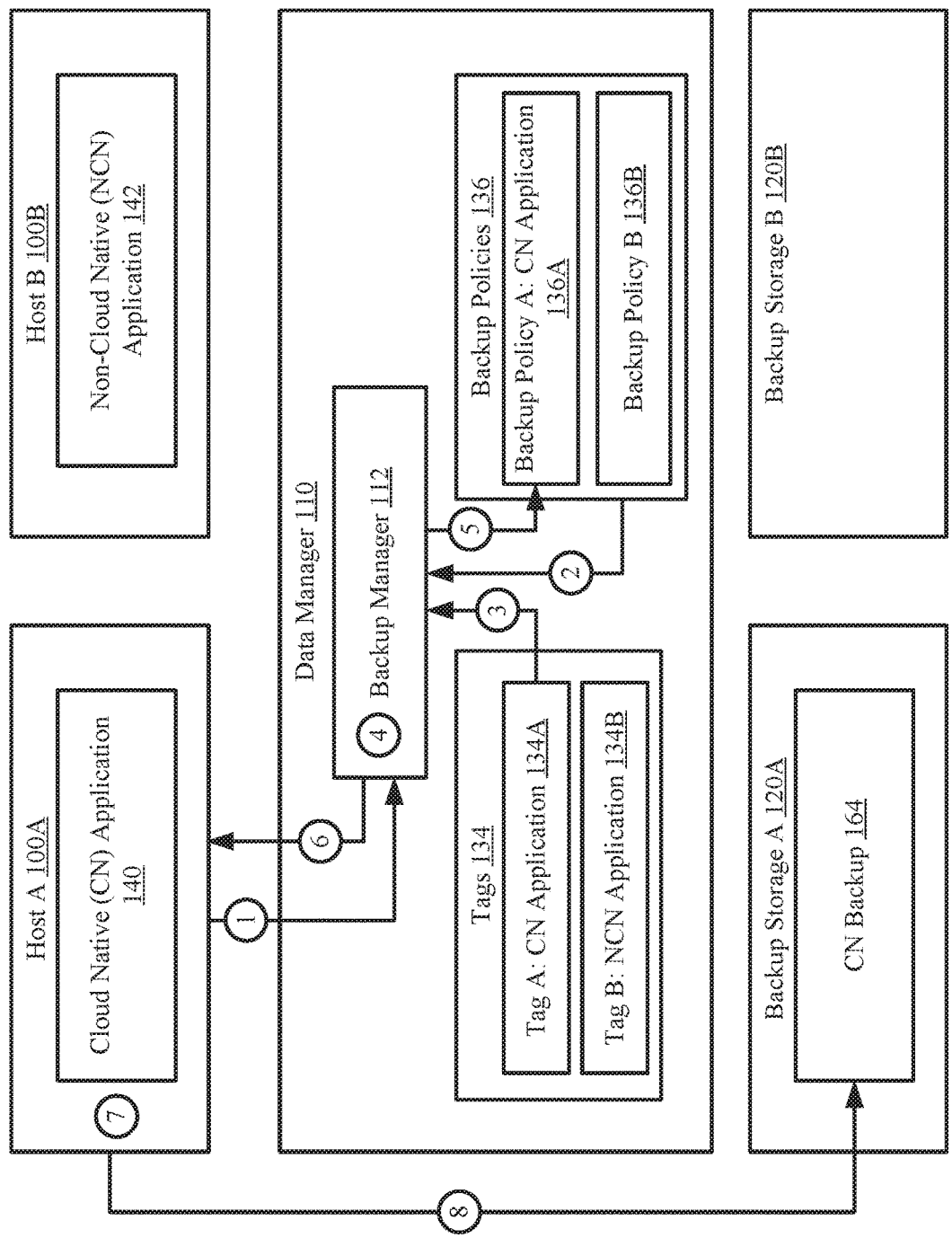
FIGS. 4B-4C show diagrams of a second example in accordance with one or more embodiments of the invention.
Figure 4C:
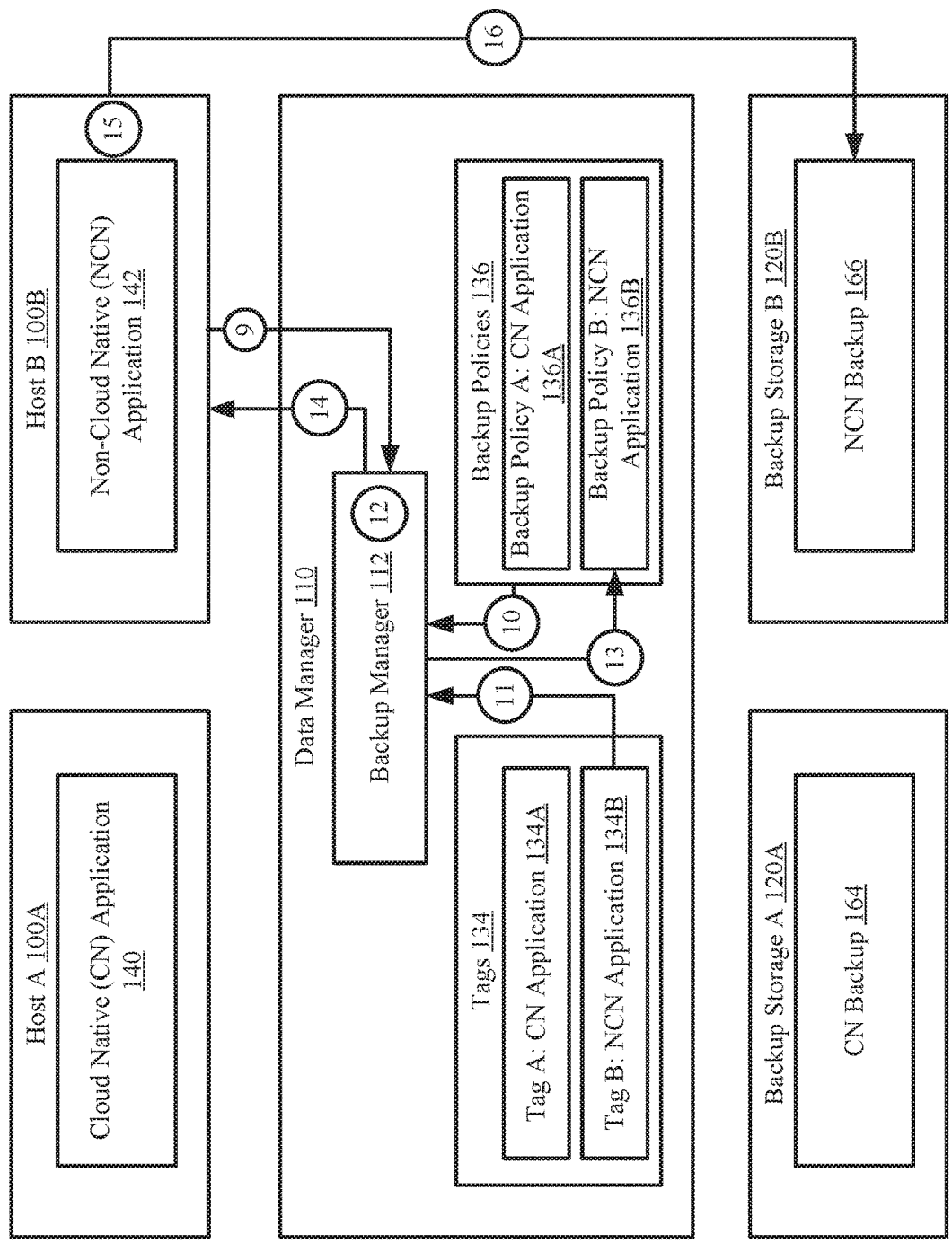

The following section describes two examples. The examples are not intended to limit the invention. The examples are illustrated in FIGS. 4A-4C, where FIG. 4A shows the first example and FIGS. 4B-4C show the second example. Turning to the first example, consider a scenario in which an application registers with a data manager.

FIG. 4A shows a diagram of a first example in accordance with one or more embodiments of the invention. The system illustrated in FIG. 4A includes fewer components than the system depicted in FIG. 1A for the sake of brevity. The system illustrated in FIG. 4A includes two hosts, host A (100A) and host B (100B). Host A (100A) includes a cloud native (CN) application (140) and host B (100B) includes a non-cloud native (NCN) application (142). The system also includes a data manager (110). The data manager (110) includes a backup manager (112), tags (134) and backup policies (136). The tags (134) include tag A (134A) and tag B (134B). Backup policies (136) include backup policy A (136A) and backup policy B (136B). Finally, the system includes backup storage A (120A) and backup storage B (120B).

At a first point in time, host A (100A) sends a registration request associated with the CN application (140) to the backup manager (112) [1]. The backup manager (112) then sends a request for host metadata associated with the CN application (140) to host A (100A). In response to obtaining the request, host A (100A) generates or obtains host metadata associated with the CN application (140) and sends the host metadata to the backup manager (112) [2]. After obtaining the host metadata, the backup manager (112) generates a copy of tag A (134A) based on the host metadata [3]. The host metadata indicates that the CN application (140) is a cloud native application and tag A is a cloud native application tag. The backup manager then associates tag A (134A) with the CN application (140) [4].

Following that, host B (100B) sends a registration request associated with the NCN application (142) to the backup manager (112) [5]. The backup manager (112) then sends a request for host metadata associated with the NCN application (142) to host B (100B). In response to obtaining the request, host B (100B) generates or obtains host metadata associated with the NCN application (142) and sends the host metadata to the backup manager (112) [6]. After obtaining the host metadata, the backup manager (112) generates a copy of tag B (134B) based on the host metadata [7]. The host metadata indicates that the NCN application (142) is a non-cloud native application and tag B is a non-cloud native application tag. The backup manager then associates tag B (134B) with the NCN application (142) [8].

Turning to the second example, consider a scenario in which a backup manager of a data manager assigns backup policies to a cloud native application and a non-cloud native application. FIGS. 4B-4C show diagrams of a second example in accordance with one or more embodiments of the invention. The system illustrated in FIGS. 4B-4C includes fewer components than the system depicted in FIG. 1A for the sake of brevity. The system illustrated in FIGS. 4B-4C includes two hosts, host A (100A) and host B (100B). Host A (100A) includes a cloud native (CN) application (140) and host B (100B) includes a non-cloud native (NCN) application (142). The system also includes a data manager (110). The data manager (110) includes a backup manager (112), tags (134) and backup policies (136). The tags (134) include tag A (134A) and tag B (134B). Backup policies (136) include backup policy A (136A) and backup policy B (136B). Finally, the system includes backup storage A (120A) and backup storage B (120B).

Turning to FIG. 4B, at a first point in time, host A (100A) sends a backup generation request associated with the CN application (140) to the backup manager (112) [1]. The backup manager (112) then obtains the backup policies (e.g., 136A, 136B) from persistent storage [2]. After that, the backup manager (112) obtains the tag (e.g., tag A (134A)) associated with the application from persistent storage [3]. The backup manager (112) then determines that the CN application (140) is a cloud native application based on tag A (134A) [4]. The backup manager (112) then assigns backup policy A (136A) to the CN application (140) as backup policy A (136A) is a cloud native backup policy [5]. After assigning backup policy A (136A) to the CN application (140), the backup manager (112) sends a backup generation request to host A (100A) [6]. In response to obtaining the backup generation request, host A (100A) generates a CN backup (164) based on backup policy A (136A) [7]. Host A (100A) then sends the CN backup (164) to backup storage A (120A), which stores the CN backup (164) in persistent storage [8].

Turning to FIG. 4C, after the CN backup (164) is stored in backup storage A (120A), host B (100B) sends a backup generation request associated with the NCN application (142) to the backup manager (112) [9]. The backup manager (112) then obtains the backup policies (e.g., 136A, 136B) from persistent storage [10]. After that, the backup manager (112) obtains the tag (e.g., tag B (134B)) associated with the application from persistent storage [11]. The backup manager (112) then determines that the NCN application (142) is a non-cloud native application based on tag B (134B) [12]. The backup manager (112) then assigns backup policy B (136B) to the NCN application (142) as backup policy B (136B) is a non-cloud native backup policy [13]. After assigning backup policy B (136B) to the NCN application (142), the backup manager (112) sends a backup generation request to host B (100B) [14]. In response to obtaining the backup generation request, host B (100B) generates a NCN backup (166) based on backup policy B (136B) [15]. Host B (100B) then sends the NCN backup (166) to backup storage B (120B), which stores the NCN backup (166) in persistent storage [16].

End of Examples

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to backup policies to cloud native applications and non-cloud native applications. Further, in various embodiments of the invention, tags that indicate application characteristics are associated with applications when an application is registered with a data manager. The data manager uses the tags to automatically assign cloud native backup policies and non-cloud native backup policies to the applications. The use of tags to assign backup policies to cloud native and non-cloud native applications increases the efficiency of assigning backup policies to applications in complex environments.

In traditional systems, backup policies were manually assigned to cloud native applications and non-cloud native applications by a user of the system. In systems with a large number of both cloud native applications and non-cloud native applications, the process of manually assigning backup policies to the applications may be complex and require a significant amount of time. Embodiments of the invention improve the efficiency of managing cloud native and non-cloud native applications by automatically assigning backup policies to applications using tags associated with the applications.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for backing up data, the method comprising:
   obtaining, by a backup manager, a first request from a host, wherein the first request is associated with an application on the host;
   in response to the first request:
      obtaining backup policies;
      obtaining a tag associated with the application;
      making a first determination that the tag indicates that the application is a cloud native application; and
      in response to the first determination:
         associating the application with a cloud native backup policy, wherein the cloud native backup policy is one of the backup policies; and
         initiating backup generation of the application based on the cloud native backup policy.

2. The method of claim 1, wherein the backup policies further comprise:
   a non-cloud native backup policy.

3. The method of claim 1, wherein associating the application with the cloud native backup policy comprising selecting the cloud native backup policy from a plurality of cloud native backup policies.

4. The method of claim 1, wherein the cloud native application is associated with cloud native storage.

5. The method of claim 1, further comprising:
   prior to obtaining the first request from the host:
      obtaining a registration request associated with the application;
      obtaining host metadata associated with the application;
      generating the tag based on the host metadata; and
      associating the tag with the application.

6. The method of claim 5, wherein the host metadata specifies that the application is associated with cloud native storage.

7. The method of claim 1, further comprising:
   obtaining, by the backup manager, a second request from the host, wherein the second request is associated with a second application hosted by the host;
   in response to the second request:
      obtaining a second tag associated with the second application;
      making a second determination that the second tag indicates the second application is a non-cloud native application; and
      in response to the second determination:
         associating the second application with a non-cloud native backup policy, wherein the non-cloud native backup policy is one of the backup policies; and
         initiating backup generation of the second application based on the non-cloud native backup policy.

8. A system for backing up data, comprising:
   a processor;
   a backup manager, which when executed by the processor performs a method, the method comprising:
      obtaining, by the backup manager, a first request from a host, wherein the first request is associated with an application on the host;

in response to the first request:
  obtaining backup policies;
  obtaining a tag associated with the application;
  making a first determination that the tag indicates that the application is a cloud native application; and
  in response to the first determination:
    associating the application with a cloud native backup policy, wherein the cloud native backup policy is one of the backup policies; and
    initiating backup generation of the application based on the cloud native backup policy.

9. The system of claim 8, wherein the backup policies further comprise:
a non-cloud native backup policy.

10. The system of claim 8, wherein associating the application with the cloud native backup policy comprising selecting the cloud native backup policy from a plurality of cloud native backup policies.

11. The system of claim 8, wherein the cloud native application is associated with cloud native storage.

12. The system of claim 8, wherein the method further comprising:
prior to obtaining the first request from the host:
  obtaining a registration request associated with the application;
  obtaining host metadata associated with the application;
  generating the tag based on the host metadata; and
  associating the tag with the application.

13. The system of claim 12, wherein the host metadata specifies that the application is associated with cloud native storage.

14. The system of claim 8, further comprising:
obtaining, by the backup manager, a second request from the host, wherein the second request is associated with a second application hosted by the host;
in response to the second request:
  obtaining a second tag associated with the second application;
  making a second determination that the second tag indicates the second application is a non-cloud native application; and
  in response to the second determination:
    associating the second application with a non-cloud native backup policy, wherein the non-cloud native backup policy is one of the backup policies; and
    initiating backup generation of the second application based on the non-cloud native backup policy.

15. A non-transitory computer readable medium comprising computer readable program code, which when executed by a computer processor enables the computer processor to perform a method for backing up data, the method comprising:
obtaining, by a backup manager, a first request from a host, wherein the first request is associated with an application on the host;
in response to the first request:
  obtaining backup policies;
  obtaining a tag associated with the application;
  making a first determination that the tag indicates that the application is a cloud native application; and
  in response to the first determination:
    associating the application with a cloud native backup policy, wherein the cloud native backup policy is one of the backup policies; and
    initiating backup generation of the application based on the cloud native backup policy.

16. The non-transitory computer readable medium of claim 15, wherein the backup policies further comprise:
a non-cloud native backup policy.

17. The non-transitory computer readable medium of claim 15, wherein associating the application with the cloud native backup policy comprising selecting the cloud native backup policy from a plurality of cloud native backup policies.

18. The non-transitory computer readable medium of claim 15, wherein the cloud native application is associated with cloud native storage.

19. The non-transitory computer readable medium of claim 15, wherein the method further comprising:
prior to obtaining the first request from the host:
  obtaining a registration request associated with the application;
  obtaining host metadata associated with the application;
  generating the tag based on the host metadata; and
  associating the tag with the application.

20. The non-transitory computer readable medium of claim 19, wherein the host metadata specifies that the application is associated with cloud native storage.

* * * * *